(12) United States Patent
Shimizu

(10) Patent No.: US 6,208,803 B1
(45) Date of Patent: Mar. 27, 2001

(54) RECORDING AND/OR REPRODUCING APPARATUS WHICH PRODUCES MAIN INFORMATION AND HISTORICAL INFORMATION WITH RESPECT TO SIGNAL PROCESSING PERFORMED ON THE MAIN INFORMATION

(75) Inventor: Tetsuya Shimizu, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 08/979,964

(22) Filed: Nov. 26, 1997

Related U.S. Application Data

(63) Continuation of application No. 08/681,496, filed on Jul. 23, 1996, now abandoned, which is a continuation of application No. 08/174,441, filed on Dec. 28, 1993, now abandoned.

(30) Foreign Application Priority Data

Dec. 28, 1992 (JP) .................................................. 4-347545

(51) Int. Cl.[7] .................................................. H04N 5/76
(52) U.S. Cl. .......................................... 386/116; 386/124
(58) Field of Search .................................. 386/1, 21, 40, 386/46, 113, 114, 116, 124.111; 360/32, 48, 53–54; 348/606, 607; 371/30–31, 37.5; H04N 5/76, 5/78, 5/92, 5/94, 5/91

(56) References Cited

U.S. PATENT DOCUMENTS

| 4,982,284 | * | 1/1991 | Koga ................................ 348/390 |
| 5,060,077 | * | 10/1991 | Koya et al. ........................ 358/335 |
| 5,070,503 | * | 12/1991 | Shikakura ......................... 358/336 |
| 5,140,437 | * | 8/1992 | Yonemitsu et al. ............... 358/335 |
| 5,179,453 | * | 1/1993 | Tozaki .............................. 358/336 |
| 5,313,471 | * | 5/1994 | Otaka et al. ..................... 358/310 |
| 5,404,248 | * | 4/1995 | Shimoda et al. ................. 358/335 |
| 5,594,598 | * | 1/1997 | Shikakura ......................... 386/109 |

FOREIGN PATENT DOCUMENTS

0353757 * 2/1990 (EP) .............................. H04N/5/92

* cited by examiner

*Primary Examiner*—Thai Tran
(74) *Attorney, Agent, or Firm*—Fitzpatrick, Cella, Harper & Scinto

(57) ABSTRACT

This invention provides a recording and/or reproducing apparatus having a reproducing circuit for reproducing coded main information, and historical information, with respect to signal processing which was performed on the main information. An error correcting circuit corrects a code error in the main information. The reproducing circuit provides error correcting information with respect to the error correcting processing. A first constructing circuit constructs coded data based on the correcting information by concealing an error which cannot be corrected by said error correcting circuit. A decoding circuit decodes the main information provided by the first constructing circuit, and a second constructing circuit constructs decoded data by concealing the error, which cannot be corrected by the error correcting circuit, in the main data which has been decoded by the decoding circuit. The decoded data is constructed based on the historical information and the correcting information, thus preventing degradation of the signal and allowing a high quality image to be obtained.

29 Claims, 3 Drawing Sheets

RECORDING AND/OR REPRODUCING APPARATUS WHICH PRODUCES MAIN INFORMATION AND HISTORICAL INFORMATION WITH RESPECT TO SIGNAL PROCESSING PERFORMED ON THE MAIN INFORMATION

This application is a continuation of application Ser. No. 08/681,496 filed Jul. 23, 1996, now abandoned, which is a continuation of application Ser. No. 08/174,441, filed Dec. 28, 1993, now abandoned.

BACKGROUND OF THE INVENTION

1. Field of the Invention

The present invention relates to a recording and/or reproducing apparatus, and more particularly to a recording and/or reproducing apparatus for digitally recording and/or reproducing information such as images and voices on/from a recording medium.

2. Description of the Related Art

Traditional apparatuses of this type include a digital video tape recorder (VTR) or digital video cassette recorder (VCR). In the digital VTR, there are two known digital recording methods: one is to record base band digital data associated with images or voices on a recording medium without data compression, and the other method records data, after reducing the amount of data, by performing data compression such as discrete cosine transformation (DCT) or variable length coding (VLC).

In the former method, or base band recording method, signals can be transmitted without degradation in the signal-to-noise ratio. In addition, in the base band recording method, it is possible to connect different types of apparatus to each other, and a digital switch is available. However, because the base band recording method does not involve performing data-compression, there are disadvantages in that a large amount of data must be recorded and that long recording on a recording medium is impossible.

In the latter method, on the other hand, signals (video or voice signals) to be recorded are subjected to high efficiency coding and further to error correction coding. The signals are then modulated and recorded on a recording medium. When the signals are reproduced, inverse processing is carried out. This method has the advantage that the amount of recording data can be greatly reduced. However, this method also has the disadvantage that distortion of data occurs due to the high efficiency coding and decoding, i.e., noise is generated and a slight degradation of picture quality occurs.

For example, when compression coding is carried out by means of orthogonal transformation such as DCT, data is rounded off after orthogonal transformation. Thus, the data digits cannot be perfectly preserved during calculation. These errors cause distortion of data after inverse orthogonal transformation. If editing or dubbing is repeatedly carried out, the degradation in picture quality will gradually increase.

To overcome this problem, a method has been proposed in which dubbing is carried out with coded signals before decoding. For example, in a reproducing apparatus, error correction is performed on reproducing data and if there is coded data having an error which cannot be corrected, interpolation is performed on the data using data corresponding to the same pixel location of preceding and succeeding frames. Then, the data is sent to an error correction coding circuit in the recording apparatus.

However, in the conventional recording and reproducing apparatus described above, the recording apparatus treats all data in the same way, without distinction between the data which has been interpolated in the reproducing apparatus and the data which has been reproduced correctly. The recording apparatus therefore records the data on a recording medium without distinguishing between the data which has been interpolated in the reproducing apparatus and the correct data which has not been interpolated.

As a result, when data which has been dubbed in this way is reproduced, the reproduction is performed without distinguishing between the data which has been interpolated and the data which has been reproduced correctly. If failure occurs in correction for some data, there is a possibility that the interpolation circuit will perform interpolation on this uncorrectable data by using the data which has already been interpolated by the reproducing apparatus during the dubbing operation. If such an interpolation occurs, the desired quality of pictures and sounds cannot be maintained and degradation will occur in the reproduced pictures.

In addition, the characteristic features of pictures do not contribute to interpolation for high-efficiency-coded data. This causes such a problem in that it is impossible to perform adaptive processing, such as switching between intra-frame interpolation (or intra-field interpolation) and inter-frame interpolation (or inter-field interpolation) depending on motion detection. As a result, in some cases, distortion occurs in a region corresponding to interpolated data.

SUMMARY OF THE INVENTION

Accordingly, it is an object of the present invention to solve the problems described above.

More specifically, it is an object of the present invention to provide a recording and/or reproducing apparatus which can provide a high quality picture without degradation of signals.

To achieve the objects described above, the present invention provides a reproducing apparatus, having means for reproducing coded main information and also historical information with respect to signal processing which was performed on the main information at a past time, means for correcting a code error in the main information reproduced by the reproducing means, the error correcting means providing error correcting information with respect to the error correcting processing; first constructing means for constructing coded data for error data which cannot be corrected by the error correcting means, the coded data being constructed based on the error correcting information; decoding means for decoding the main information provided via the first constructing means; and second constructing means for constructing decoded data which has been decoded by the decoding means, or the error data which cannot be corrected by the error correcting means, the decoded data being constructed based on the historical information and on the correcting information.

Additional objects and features of the present invention will become apparent from the following detailed description taken in conjunction with the accompanying drawings.

DESCRIPTION OF THE PREFERRED EMBODIMENTS

Referring to the figures, embodiments of the present invention will be described below.

Figure 1:
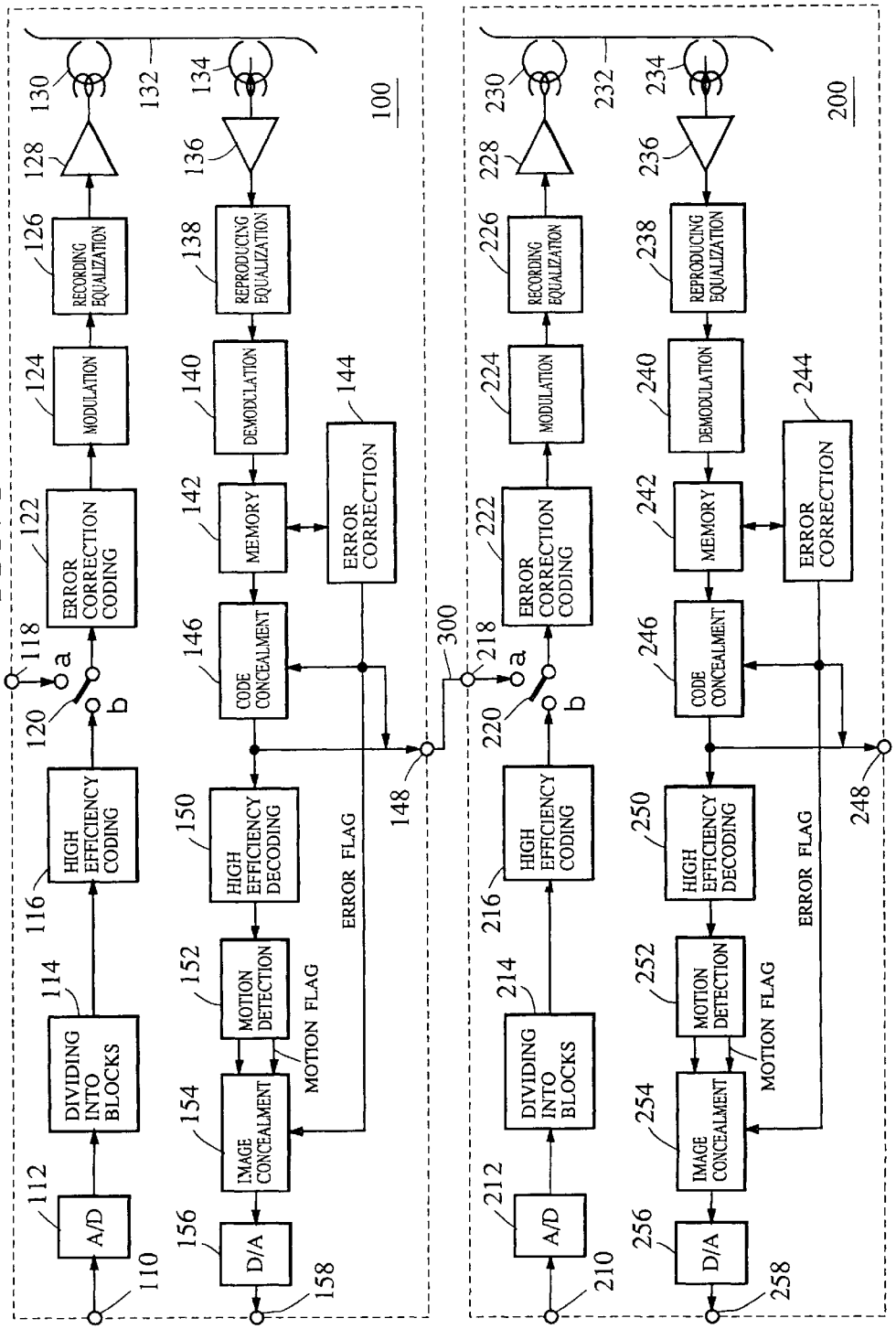
FIG. 1 is a block diagram showing a configuration of a digital VTR embodying the present invention.

FIG. 1 is a block diagram illustrating configurations of two digital VTRs in accordance with a first embodiment of the present invention, wherein the digital VTRs are connected to each other for digital dubbing operation, and only major elements are shown.

General recording and reproducing operations will be described first for a digital VTR 100. In the following description of this embodiment, only recording and reproducing operations for video signals will be described; no description will be given for voice signals. An analog-to-digital converter 112 converts an analog video signal, applied to an input terminal 110, into a digital signal. A block-dividing circuit 114 divides the signal provided by the analog-to-digital converter 112 into blocks (hereafter referred to as DCT blocks), each of which consists of 8×8 pixels, and provides the signal to a high efficiency coding circuit 116. The high efficiency coding circuit 116 performs discrete cosine transformation (hereafter referred to as DCT), performs quantization of the transformation coefficients, and, performs variable length coding so as to perform high efficiency compression. In this compression operation, thirty DCT blocks are divided into five synchronous blocks, from the viewpoints of error propagation and special reproduction.

Figure 2:
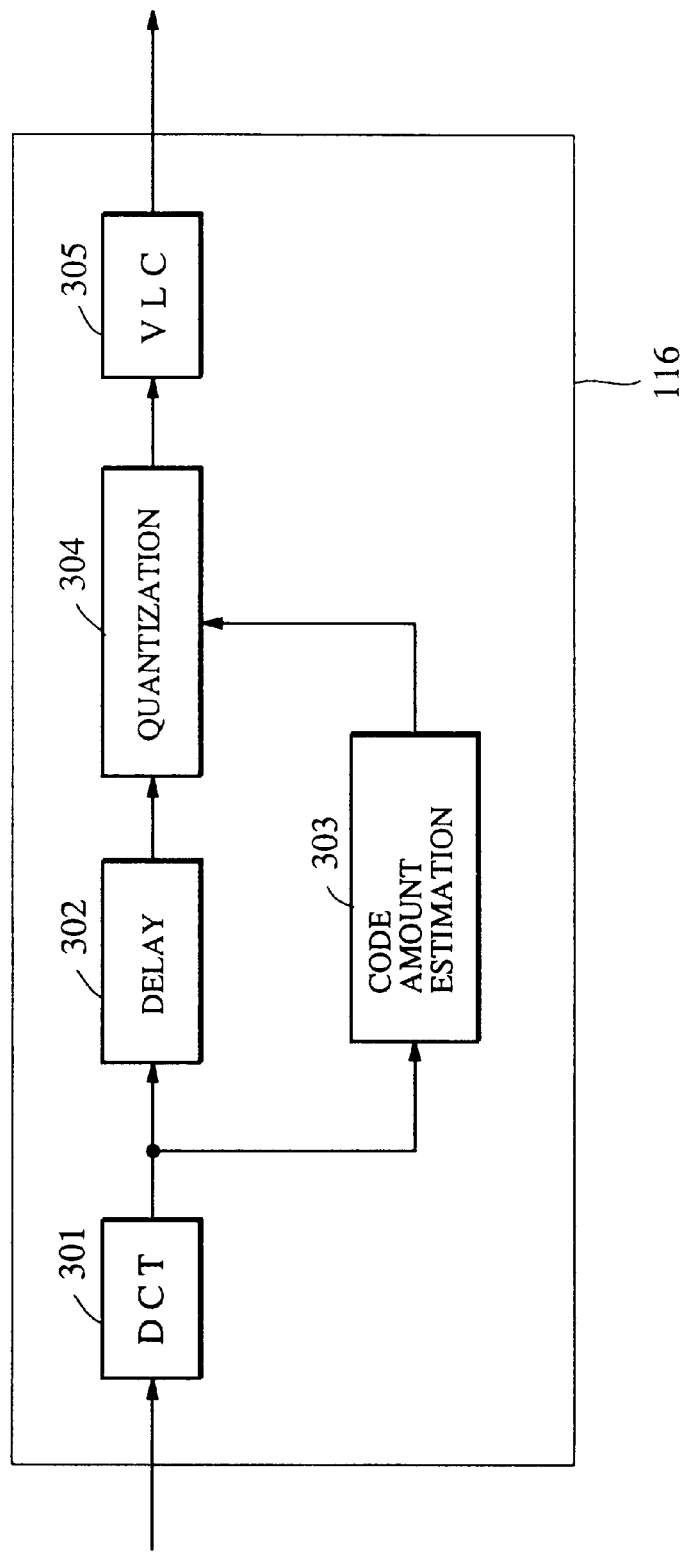
FIG. 2 is a block diagram showing a configuration of the high efficiency coding circuit of the apparatus shown in FIG. 1.

Referring to FIG. 2, the operation of the high efficiency coding circuit 116 will be described below.

The video signal, which has been divided into DCT blocks by the block-dividing circuit 114, is converted by a DCT circuit 301 from a space domain signal to a frequency domain signal, and the signal is then provided to a delay circuit 302 and also to a code amount estimation circuit 303. The code amount estimation circuit 303 performs quantization and DCT on the applied signal for each of thirty DCT blocks and determines the amount of codes for thirty DCT blocks. Based on the amount of codes, quantization coefficients for quantization processing are determined. A signal (quantizing number) representing the determined quantization coefficient is provided to a quantization circuit 304.

The delay circuit 302 provides a delay corresponding to the time required for estimation of the amount of data (determination of the quantizing number). The quantization circuit 304 has a table associated with quantization coefficients corresponding to a plurality of quantizing numbers, and it quantizes the video signal, which has been already subjected to DCT, by using a quantization coefficient corresponding to the quantizing number provided by the code amount estimation circuit 303. The quantized video signal is then coded by a VLC circuit 305 by means of coding, such as 2-dimensional Huffman coding, and the resulting signal is provided to a switch 120 shown in FIG. 1. As a result of the successive processing in the high efficiency coding circuit 116, the amount of video data is reduced and DCT blocks with a certain amount of data are compressed into a predetermined size of synchronization blocks.

The video signal, which has been reduced as to the amount of data by the high efficiency coding circuit 116, is applied via the switch 120 to an error correction coding circuit 122. The error correction coding circuit 122 produces parity bits for error correction by means of an error correction coding scheme, such as double Reed-Solomon coding, and adds the produced parity bits to the video data. The video data with parity bits is applied to a modulator 124. The modulator 124 adds sync codes and ID codes to a series of data, consisting of high-efficiency-coded data and parity bits for error correction, so as to form synchronous blocks. The data is then modulated and applied to a recording equalizer 126. The output data of the modulator 124 is equalized by the recording equalizer 126 and is then amplified to a predetermined level by a recording amplifier 128. The data is then recorded on a recording tape 132 via a recording head 130.

Figure 3A:
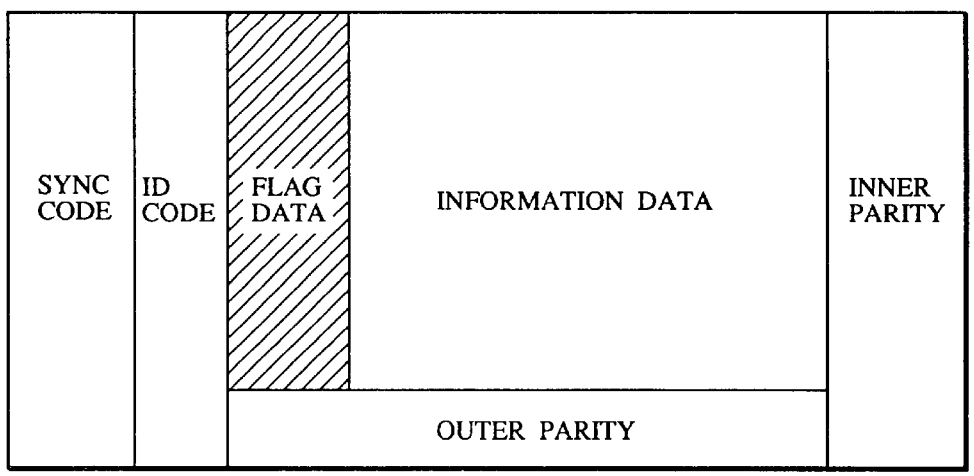
FIGS. 3a, 3b, and 3c are schematic diagrams illustrating digital formats used in the embodiments of the present invention.

FIG. 3 shows a recording format for one synchronous block in accordance with the present embodiment. An inner parity bit and an outer parity bit are produced by means of double Reed-Solomon coding for the information data (the video data in this case). A sync code and an ID code (identification information) are also added so as to construct the data in the form of synchronous blocks. At this time, 0's are commonly written in a flag data area denoted by slanted lines. In this area, error flag information provided by a reproducing apparatus will be written at a time when dubbing is carried out, as will be described later.

The data, which has been recorded as described above, may be reproduced in the following way. Output data reproduced by a reproducing head 134 (shown in FIG. 1) is applied to a demodulator 140, via a reproducing amplifier 136 and reproducing equalizer 138. The data is demodulated by the demodulator 140 and the data is then stored in a memory 142 according to a reproduced ID code. An error correction circuit 144 decodes the inner parity then the outer parity, so as to correct errors of the reproduced data stored in the memory 142, within its correction ability. An error flag is set for uncorrectable data for each set of constant-sized blocks (five blocks). The error flag is provided to a code concealment circuit 146, the output terminal 148, and an image concealment circuit 154.

If the error flag is set, the code concealment circuit 146 replaces the data with that of preceding frame for each of the constant-sized blocks (five blocks) to which the error flag is set, rather than rewriting the data in the memory 142. That is, the code concealment circuit 146 performs code-based inter-frame interpolation on uncorrectable coded data. The output data of the code concealment circuit 146 is provided to the output terminal 148 and to a high efficiency decoding circuit 150.

The high efficiency decoding circuit 150 performs processing which is inverse to the processing performed by the high efficiency coding circuit 116. The variable length data is subjected to decoding, inverse quantization, and inverse DCT. Therefore, the output data of the code concealment circuit 146 is decoded and the reproduced video data is provided to a motion detection circuit 152. The motion detection circuit 152 determines, by means of inter-field calculation, whether motion exists between fields of the reproduced pictures, and the motion detection circuit 152 provides, in synchronization with the output data of the high efficiency decoding circuit 150, a motion flag which indicates existence of motion. As a matter of course, the motion detection may be performed for each area having a small size.

As described above, the image concealment circuit 154 performs interpolation on the output data (reproduced image) of the high efficiency decoding circuit 150 or 250, based on the error flag provided by the error correction circuit 144 or 244 and also according to the motion flag provided by the motion detection circuit 152 or 252. More specifically, intra-field interpolation, using adjacent pixels within a field, is carried out on a DCT block having motion to which the error flag is set. The intra-field interpolation is also performed for a DCT block if the error flag is set to both of two successive fields.

If the error flag is set to certain data and if motion is not detected in that data, the inter-frame interpolation has been carried out on the data by the code concealment circuit 146, and the video signal which has been subjected to inter-frame interpolation is directly output. On the other hand, for the data to which motion has been detected, interpolation can be performed by using data within a field, which has better correlation with respect to time. Thus, optimized interpolation can be performed corresponding to the detected motion of the image.

The reproduced image data, which has been subjected to interpolation by the image concealment circuit 154, is further converted to analog data by a digital-to-analog converter 156 and then is output to the outside via an output terminal 158.

The digital dubbing operation will now be described in which the output terminal 148, of the recording and reproducing apparatus 100, is connected via a coaxial cable 300 to an input terminal 218 of a digital VTR 200. In this dubbing operation, a switch 220 of the digital VTR 200 is switched to select a contact (a).

In the digital VTR 100, recording signal recorded on a magnetic tape 132 is reproduced in a manner described above, and thus errors in the reproduced data are corrected by the error correction circuit 144, within its correction ability, and data having uncorrectable errors are subjected to code-based interpolation at the code concealment circuit 146. The data which has been interpolated by the code concealment circuit 146, together with an error flag provided by the error correction circuit 144, is applied via the output terminal 148 and via the cable 300 to an input terminal 218 and further to an error correction coding circuit 222 via a switch 220. In this operation, the error flag is inserted into the flag data area, which is denoted by slanted lines in FIG. 3, and it is then provided to the error correction coding circuit 222.

The error correction coding circuit 222 produces an inner parity code and outer parity code for error correction, as in the case of recording described above. Succeeding operations are then carried out in the same way as that in the recording operations described above, and the data is recorded on a recording tape 232.

When the image which has been recorded by a dubbing operation in this way is reproduced, the error correction circuit 244 provides an error flag (a current flag) to a code concealment circuit 246. The error flag has been produced for an uncorrectable block on the basis of the parity for error correction which has been added to the data by the error correction coding circuit 222. The error correction circuit 244 also provides an error flag recorded in the flag data area (a previous error flag), which has been produced for uncorrectable data during the reproducing operation in the digital VTR 100, together with the current error flag, to an output terminal 248 and also to an image concealment circuit 254.

The code concealment circuit 246 performs code interpolation based on the current error flag, and the image concealment circuit 254 performs image interpolation based on both the current and previous error flags. These interpolation operations are carried out in the same way as that of the reproducing operation.

As described above, in the arrangement of the present embodiment, there is provided an area in which a flag, indicating that the data is uncorrectable, is written for each information data. Thus, in a digital dubbing operation, reproduced data is output together with the flag indicating that the data is uncorrectable, whereby it becomes possible to prevent the dubbed data from being interpolated by using the uncorrectable data. As a result, the quality of pictures in digital dubbing is improved.

In the present embodiment, the flag data area is provided for each synchronous block, whereby it becomes possible to perform code-based interpolation for each synchronous block.

In this embodiment, the code concealment circuits 146 and 246 perform interpolation for each constant-sized block. However, the interpolation may also be performed for each synchronous block, taking into account the following matters. In the present embodiment, thirty DCT blocks are compressed into five constant-sized synchronous blocks. However, the data of each DCT block is not transferred to respective synchronous blocks in the order of frequency from low to high, i.e., the data is not recorded (output) in the order of occurrence of DCT processing. As a result, if code interpolation is carried out for each synchronous block, each of the blocks in five synchronous blocks will be broken up. More specifically, high frequency data are included in the synchronous blocks. It is possible that the data in a certain synchronous block will include the high frequency data of a DCT block in other synchronous blocks. Therefore, if code interpolation is carried out for each synchronous block, the high frequency data may be deleted and the entire coded data (from low frequency to high) of the five synchronous blocks may not be perfectly decoded.

To avoid the problem described above, the error flag may consist of data having a plurality of bits so that the flag may indicate whether the data is uncorrectable, whether the data has been interpolated, and what the unit of code interpolation is (or which synchronous block has been interpolated). Thus, it becomes possible to demodulate the data for each synchronous block. In this case, when error correction is carried out, the error flag which has been previously stored in the flag data area should be read out and, taking into account the contents of this flag data, a new error flag including should be produced so as to reflect both the result of error correction and the previous error flag. In this case, the image concealment circuit 254 also performs intra-field interpolation based on the error flag stored in the flag data area as in the case described above.

In this embodiment, inter-frame interpolation is carried out by the code concealment circuits 146 and 246. However, the inter-frame interpolation may be carried out after decoding is carried out, by a succeeding stage, so that a suitable selection is made between intra-field interpolation data and inter-field interpolation data based on the result of the detection of motion. In this case, the image concealment circuits 154 and 254 become unnecessary, and, instead, a frame memory is added to a location after decoding.

In this embodiment, a tape is used as a recording medium. However, any recording media, including a magnetic disk, optical disk, magneto-optical disk, and hard disk may also be used. The present invention may be applied to recording and reproducing between different types of recording media, with the same effect as that in the previously-described example.

Figure 3B:
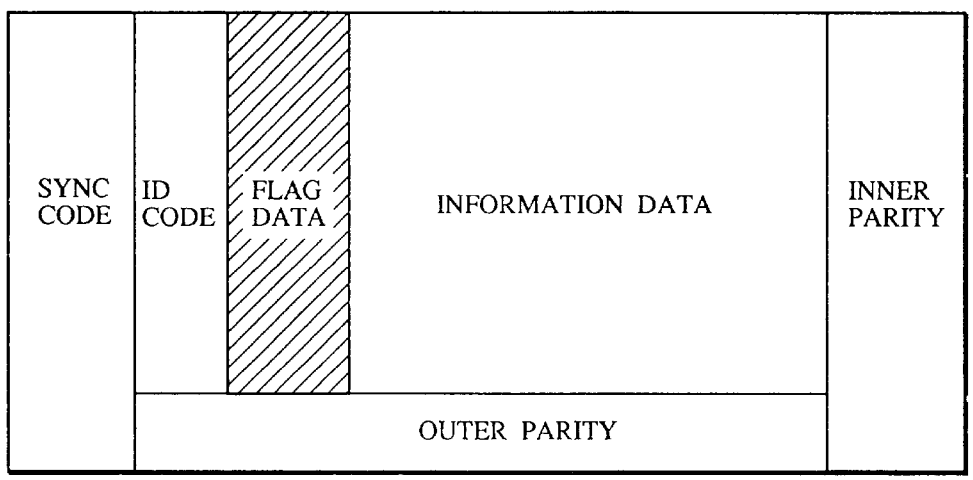
Figure 3C:
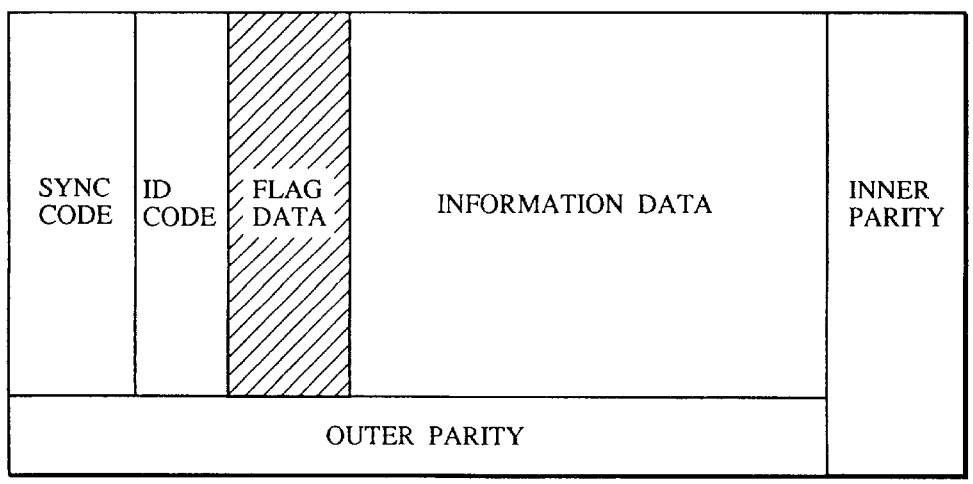

In this embodiment, outer parity is added to the error flag and to information data. However, outer parity may also be added to the ID code and to the sync code, as shown in FIGS. 3b and 3c, depending on its importance. In this case, it is possible to obtain a correct ID code and sync code, and thereby to obtain better quality of pictures.

What is claimed is:

1. A reproducing apparatus, comprising:
   (a) reproducing means for reproducing coded image data by a high efficiency coding method and historical information indicating whether the coded image data was concealed at a previous time;
   (b) error correcting means for correcting a code error in the image data reproduced by said reproducing means, said error correcting means providing error correcting information indicating whether error data which cannot be corrected by said error correcting means is in the image data reproduced by said reproducing means;
   (c) first concealing means for forming coded image data coded by the high efficiency coding method for the error data according to the error correcting information;
   (d) decoding means for decoding the coded image data provided by said first concealing means; and
   (e) second concealing means for forming decoded image data, which has been decoded by said decoding means, for the error data according to the historical information and to the error correcting information,
   said second concealing means forming the decoded image data for the error data by using decoded image data decoded by said decoding means.

2. An apparatus according to claim 1, wherein the historical information and the error correcting information include error concealment information, wherein the error concealment information associated with the historical information indicates that the error, which could not be corrected by error correction proceeding which was performed at a previous time, has been concealed, for the image data which has been reproduced by said reproducing means, and the error concealment information associated with the error correcting information indicates that said first concealing means has formed the coded data for the error data which cannot be corrected by said error correcting means.

3. An apparatus according to claim 1, further comprising first outputting means for outputting the decoded image data provided by said second concealing means to a peripheral device.

4. An apparatus according to claim 3, further comprising second outputting means for outputting the image data to be provided for said decoding means, the historical information, and the error correcting information to the peripheral device.

5. An apparatus according to claim 1, wherein said first concealing means forms the coded image data for the error data by using coded image data provided by said error correcting means.

6. An apparatus according to claim 1, wherein an amount of the coded image data is compressed by the high efficiency coding method, and wherein said decoding means expands the amount of the coded image data provided by said first concealing means by decoding the coded image data.

7. A dubbing system, comprising:
   a reproducing system comprising:
      (a) reproducing means for reproducing coded image data coded by a high efficiency coding method and historical information indicating whether the coded image data was concealed at a previous time;
      (b) error correcting means for correcting a code error in the image data reproduced by said reproducing means, said error correcting means providing error correcting information indicating whether error data which cannot be corrected by said error correcting means is in the image data reproduced by said reproducing means;
      (c) first concealing means for forming coded image data coded by the high efficiency coding method for the error data according to the error correcting information;
      (d) decoding means for decoding the coded image data provided by said first concealing means; and
      (e) second concealing means for forming decoded data, which has been decoded by said decoding means, for the error data according to the historical information and to the error correcting information,
      said second concealing means forming the decoded image data for the error data by using decoded image data decoded by said decoding means; and
      (f) outputting means for outputting the coded image data to be provided to said decoding means, the historical information and the error correcting information; and
   a recording system comprising:
      (a) inputting means for inputting the coded image data which have been output by said outputting means, the historical information, and the error correcting information;
      (b) coding means for coding the image data by the high efficiency coding method;
      (c) selecting means for selecting signals from (i) the coded image data, historical information and error correcting information, which have been input by said inputting means and (ii) the coded image data which have been coded by said coding means;
      (d) error-correction coding means for performing error-correction coding on the output of said selecting means; and
      (e) recording means for recording the coded image data, which have been subjected to said error-correction coding, the historical information and the error correcting information on a recording medium.

8. A reproducing apparatus, comprising:
   an image data reproducer for reproducing coded digital image data coded by a high efficiency coding method and concealment data indicating whether the coded digital image data was concealed at a previous time;
   an error corrector for correcting an error in the coded digital image data reproduced by said image data reproducer, and for providing error correcting information indicating whether error data which cannot be corrected by said error corrector is in the coded digital image data reproduced by said image data reproducer; and
   an error data concealor for replacing the error data according to the error correcting information provided by said error corrector and the concealment data reproduced by said image data reproducer, by using other coded digital image data so as to conceal the error data.

9. An apparatus according to claim 8, further comprising a decoder for decoding the coded image data provided by said error data concealor, and an interpolator for forming decoded image data, which has been decoded by said decoder, for the error data according to the error correcting information by using decoded image data decoded by said decoder.

10. An apparatus according to claim 9, further comprising a first outputting device for outputting the coded digital image data provided by said error data concealor and the error correcting information to a peripheral device, and a second outputting device for converting the decoded digital image data provided by said interpolator to analog image data and for outputting the analog image data to the peripheral device.

11. An apparatus according to claim 8, further comprising an outputting device for outputting the coded digital image data provided by said error data concealor and the error correcting information to a peripheral device.

12. An apparatus according to claim 8, wherein said error data concealor generates the other coded digital image data by using the coded digital image data provided by said error corrector.

13. An apparatus according to claim 9, wherein an amount of the coded digital image data reproduced by said image data reproducer is compressed by the high efficiency coding method, and wherein said decoder expands the amount of the coded digital image data provided by said error data concealor by decoding the coded image data.

14. An apparatus according to claim 8, wherein the high efficiency coding method includes variable length encoding.

15. An apparatus according to claim 8, wherein the coded image data reproduced by said image data reproducer has been divided into a plurality of blocks and code by the high efficiency coding method in units of the blocks.

16. An apparatus according to claim 8, wherein said concealor includes a modifier for modifying contents of the concealment data reproduced by said image data reproducer according to the error correcting information.

17. An apparatus according to claim 16, further comprising an output device for outputting the coded digital image data provided by said concealor and the concealment data modified by said modifier to a recording apparatus.

18. A reproducing apparatus for reproducing and processing coded digital image data, formed by subjecting digital image data to a discrete cosine transform and coding discrete cosine transform coefficients of the digital image data by a variable length coding method, said apparatus comprising:

an image data reproducer for reproducing the coded digital image data, an error correction check code, and concealment data indicating whether the coded digital image data was concealed at a previous time;

an error corrector for correcting an error in the coded digital image data reproduced by said image data reproducer by using the error correction check code, and for providing error correcting information indicating whether error data which cannot be corrected by said error corrector is in the coded digital image data reproduced by said image data reproducer; and a concealor for replacing the error data according to the error correcting information provided by said error corrector and the concealment data reproduced by said image data reproducer, by using another variable length code so as to conceal the error data.

19. An apparatus according to claim 18, wherein said error corrector generates error correction information indicating the error data.

20. An apparatus according to claim 18, further comprising an output device for outputting the coded digital image data processed by said concealor and the error correction information to a peripheral device, said output device including an output terminal to which a cable is connected.

21. A reproducing apparatus, comprising:

reproducing means for reproducing digital image data coded by a high efficiency coding method and concealment data indicating whether the coded digital image data was concealed at a previous time;

error correction means for correcting errors in the coded digital image data reproduced by said reproducing means by using error correction codes, said error correcting means providing error correction information indicating whether error data which cannot be corrected by said error correction means is in the coded digital image data reproduced by said reproducing means;

conceal means for forming coded image data coded by the high efficiency coding method to replace error data which cannot be corrected by said error correction means and which has been identified according to the error correction information;

decoding means for decoding the coded digital image data subjected to said concealing process by said conceal means;

modification means for modifying contents of the concealment data reproduced by said reproducing means according to the error correction information; and output means for outputting the coded digital image data subjected to said concealing process by said conceal means and the concealment data whose contents has modified by said modification means to a peripheral device.

22. An apparatus according to claim 21, further comprising second output means for converting the decoded digital image data into analog image data and outputting the analog image data.

23. An apparatus according to claim 21, wherein said reproducing means reproduces digital data consisting of a plurality of sync blocks which have sync data, ID data, the coded digital image data and the concealment data.

24. An apparatus according to claim 23, wherein said error correction codes are production codes which consist of an inner code and an outer code, and wherein each of the plurality of sync blocks has the inner code.

25. An apparatus according to claim 21, wherein the coded digital image data reproduced by said reproducing means has been divided into a plurality of blocks and coded by the high efficiency coding method in the block units.

26. An apparatus according to claim 25, wherein the coded digital image data has been coded so that a code amount of a predetermined number of the blocks is a predetermined amount.

27. An apparatus according to claim 21, wherein the peripheral device includes a recording apparatus which records the coded digital image data and the concealment data output by said output means.

28. An apparatus according to claim 21, wherein said conceal means includes a memory for storing the coded digital image data reproduced by said reproducing means, and forms the coded image data for the error data using the coded digital image data stored in the memory.

29. An apparatus according to claim 21, wherein said conceal means replaces the error data with the coded digital image data of a frame preceding a frame having the error data.

* * * * *

UNITED STATES PATENT AND TRADEMARK OFFICE
CERTIFICATE OF CORRECTION

PATENT NO.   : 6,208,803 B1                                       Page 1 of 1
DATED        : March 27, 2001
INVENTOR(S)  : Tetsuya Shimizu It is certified that error appears in the above-identified patent and that said Letters Patent is hereby corrected as shown below:

Column 2,
Line 42, "time," should read -- time; --.

Column 10,
Line 26, "has" should read -- have been --.

Signed and Sealed this

Twentieth Day of August, 2002

Attest:

Attesting Officer

JAMES E. ROGAN
Director of the United States Patent and Trademark Office